US010658678B2

United States Patent
Tong et al.

(10) Patent No.: US 10,658,678 B2
(45) Date of Patent: May 19, 2020

(54) ELECTROCATALYSTS, AND FUEL CELLS CONTAINING THEM

(71) Applicant: Georgetown University, Washington, DC (US)

(72) Inventors: YuYe J. Tong, Gaithersburg, MD (US); Dejun Chen, Arlington, VA (US)

(73) Assignee: GEORGETOWN UNIVERSITY, Washington, DC (US)

( * ) Notice: Subject to any disclaimer, the term of this patent is extended or adjusted under 35 U.S.C. 154(b) by 374 days.

(21) Appl. No.: 14/739,063

(22) Filed: Jun. 15, 2015

(65) Prior Publication Data
US 2016/0365597 A1 Dec. 15, 2016

Related U.S. Application Data

(60) Provisional application No. 62/013,318, filed on Jun. 17, 2014.

(51) Int. Cl.
*H01M 4/02* (2006.01)
*H01M 4/36* (2006.01)
(Continued)

(52) U.S. Cl.
CPC ........... *H01M 4/926* (2013.01); *H01M 4/921* (2013.01); *H01M 8/1009* (2013.01)

(58) Field of Classification Search
CPC .................................. H01M 4/92; H01M 4/02
See application file for complete search history.

(56) References Cited

U.S. PATENT DOCUMENTS 7,455,927 B2 11/2008 DiSalvo, Jr. et al.
7,632,779 B1 * 12/2009 Ding ........................ C22C 5/02
428/670
(Continued)

FOREIGN PATENT DOCUMENTS

WO WO-2005/081706 A2 9/2005
WO WO-2008/080227 A1 7/2008

OTHER PUBLICATIONS

Beltowska-Brzezinska, T. et al., "The electrooxidation mechanism of formic acid on platinum and on lead ad-atoms modified plantinum studied with the kinetic isotope effect", *Journal of Power Sources*, 251:30-37 (Elsevier B.V., 2014).
(Continued)

*Primary Examiner* — Jonathan G Leong
*Assistant Examiner* — Julian Anthony
(74) *Attorney, Agent, or Firm* — Lathrop GPM LLP; Alan W. Steele

(57) ABSTRACT

Provided are electrocatalysts, fuel cells, methods of making fuel cells, and methods of generating an electric current, each featuring a platinum (Pt)-containing substrate in contact with an aqueous solution comprising $Pb^{2+}$. Electrocatalysts of the invention are formed via underpotential deposition (UPD) when a trace amount of $Pb^{2+}$ is present in the electrolyte of a half anodic cell for oxidizing formic acid using Pt as the anode. Surprisingly, the UPD process dramatically enhances the activity of formic acid oxidation, at least as much as 10-fold compared with palladium (Pd) black. In an embodiment, the electrocatalyst comprises a Pt-containing substrate, a submonolayer of lead (Pb) adsorbed onto the Pt-containing substrate, and an aqueous solution comprising $Pb^{2+}$, wherein the concentration of $Pb^{2+}$ in the aqueous solution is 10 to 500 μm.

19 Claims, 10 Drawing Sheets

(51) Int. Cl.
*H01M 4/92* (2006.01)
*H01M 8/1009* (2016.01)

(56) References Cited

U.S. PATENT DOCUMENTS

| | | | | |
|---|---|---|---|---|
| 8,637,207 | B2* | 1/2014 | Nakano | H01M 8/04194 |
| | | | | 220/601 |
| 2001/0053468 | A1* | 12/2001 | Kato | H01M 4/92 |
| | | | | 422/98 |
| 2003/0047459 | A1* | 3/2003 | Timonov | C25B 1/13 |
| | | | | 205/170 |
| 2003/0198852 | A1* | 10/2003 | Masel | H01M 4/8605 |
| | | | | 429/494 |
| 2004/0115518 | A1 | 6/2004 | Masel et al. | |
| 2008/0241642 | A1* | 10/2008 | Iordache | H01M 4/921 |
| | | | | 429/524 |
| 2010/0177462 | A1* | 7/2010 | Adzic | B82Y 30/00 |
| | | | | 361/502 |

OTHER PUBLICATIONS

Chang, J. et al., "An Effective Pd—Ni$_2$P/C Anode Catalyst for Direct Formic Acid Fuel Cells", *Angew Chem. Int. Ed.*, 53:122-126 (Wiley-VCH Verlag GmbH & Co., KGaA, Weinheim, 2014).

Chen, Q.-S. et al., "Significantly Enhancing Catalytic Activity of Tetrahexahedral Pt Nanocrystals by Bi Adatom Decoration", *J. Am. Chem. Soc.*, 133:12930-12933 (American Chemical Society, USA, 2011).

Xia, X. H. et al., "Influence of Underpotential Deposited Lead upon the Oxidation of HCOOH in HClO$_4$ at Platinum Electrodes", *J. Electrochem. Soc.*, 140(9):2559-2565 (The Electrochemical Society, Sep. 1993).

Borup et al. (1993) "An ex situ study of electrodeposited lead on platinum (111)," Surface Science. 293:27-34.

* cited by examiner

ELECTROCATALYSTS, AND FUEL CELLS CONTAINING THEM

RELATED APPLICATION

This application claims benefit of U.S. Provisional Patent Application No. 62/013,318, filed Jun. 17, 2014.

GOVERNMENT SUPPORT

The invention was made with government support under grant number DE-FG02-07ER15895 awarded by the Department of Energy. The government has certain rights in the invention.

BACKGROUND OF THE INVENTION

Fuel cells are electrochemical cells in which the free energy change resulting from a fuel oxidation reaction is converted into electrical energy. Organic fuel cells are a useful alternative to hydrogen fuel cells in many applications, overcoming the difficulties of storing and handling hydrogen gas. In an organic fuel cell, an organic fuel, such as methanol or formic acid (FA), is oxidized to carbon dioxide at an anode, while air or oxygen is simultaneously reduced to water at a cathode. Organic/air fuel cells have the advantage of operating with a liquid organic fuel. Although methanol and other alcohols are typical fuels of choice for direct fuel cells, U.S. Patent Application Publication Nos. 2003/0198852 and 2004/0115518 (both of which are incorporated by reference) disclose formic acid fuel cells with high power densities and current output. Exemplary power densities of 150 mW/cm$^2$ and higher were achieved at low operating temperatures and provided for compact fuel cells. Additional disclosures concerning formic acid fuel cells include WO 2005/081706 and WO 2008/080227 (both of which are incorporated by reference).

Electrocatalysts are catalysts that accelerate electrochemical reactions, without being consumed in the process. Electrocatalysts are useful as catalysts for organic fuel cells. In particular, electrocatalysts, including noble metals with or without admetals, are useful as catalysts for organic fuel cells. An admetal is a metal that modifies the properties of the noble metal catalyst and, therefore, also changes the catalyst properties. The admetal can have a function independent of the noble metal catalyst, can modify the surface of the noble metal catalyst, or can modify the electronic structure of the noble metal catalyst.

The oxidation of formic acid on noble metals, such as platinum or palladium, has been studied extensively in the last decades due to its significance in electrocatalysis of fuel-cell reactions. A generally accepted dual-path mechanism for formic acid oxidation at platinum, proposed by Capon and Parsons, has been supported by in situ infrared (IR) spectroscopy and differential electrochemical mass spectroscopy (DEMS). According to this mechanism the oxidation of formic acid molecules to $CO_2$ is assumed to occur via a reactive intermediate described as *COOH $$HCOOH \rightarrow *COOH + H^+ + e^- \tag{1}$$

$$*COOH \rightarrow CO_2 + H^+ + e^- \tag{2}$$

where * indicates the number of platinum sites bonded to the carbon atom of the organic species. The sum of the foregoing reactions, $$HCOOH \rightarrow CO_2 + 2H^+ + 2e^- \tag{3}$$

represents the so-called direct oxidation pathway, which takes place at the anode. Coupled with the cathode reaction $$\tfrac{1}{2}O_2 + 2H^+ + 2e^- \rightarrow H_2O \tag{4}$$

the overall reaction of a direct formic acid fuel cell is given by $$HCOOH + \tfrac{1}{2}O_2 \rightarrow CO_2 + H_2O \tag{5}$$

In a parallel reaction at the anode, a surface-blocking residue ("poison") is formed $$*COOH + HCOOH \rightarrow ***COH + CO_2 + H_2O \tag{6}$$

In the hydrogen region the formation of the poison is assumed to be especially fast via adsorbed hydrogen $$HCOOH \rightarrow *H + *COOH \tag{7}$$

$$*COOH + 2*H \rightarrow ***COH + H_2O \tag{8}$$

In a respective way another poison, carbon monoxide, is formed as demonstrated via in situ IR spectroscopy.

$$HCOOH \rightarrow *CO_{ads} + H_2O \rightarrow CO_2 + 2H^+ + 2e^- \tag{9}$$

Below the potential of surface oxide formation, poisons inhibit the direct oxidation path. Hence, the oxidation of HCOOH at pure platinum, generally regarded as a good catalyst, proceeds only at a relatively low rate.

Xia et al. (1993) *J Electrochem Soc* 140(9):2559-65 reported a pronounced catalytic effect of underpotential deposited ("UPD") lead adatoms on the oxidation of formic acid on a platinum electrode in $HClO_4$. In this report, the electrolyte solution was a $2.11 \times 10^{-3}$ M $Pb^{2+}$ + 0.1 M $HClO_4$ solution.

More recently, Beltowska-Brzezinska et al. (2014) *J Power Sources* 251:30-7 reported poisoning of a platinum electrode surface by a CO-like species was prevented by suppression of dissociative chemisorption of formic acid due to a fast competitive underpotential deposition of lead adatoms on the Pt surface from an acidic solution containing $10^{-3}$ M $Pb^{2+}$ cations.

SUMMARY OF THE INVENTION

The present invention concerns certain platinum (Pt)-lead (Pb) systems that possess unexpectedly superior activity and stability compared to currently known electrocatalysts for formic acid electro-oxidation. The electrocatalysts of the invention are formed via underpotential deposition (UPD) when a trace amount of $Pb^{2+}$ is present in the electrolyte of a half anodic cell for oxidizing formic acid using Pt as the anode. Surprisingly, the UPD process dramatically enhances the activity of formic acid oxidation, at least as much as 10-fold compared with palladium (Pd) black. An optimal concentration of $Pb^{2+}$ can be determined for a given concentration of formic acid, which can be as high as 1.5 M in formic acid. As yet a further advantage, electrocatalysts of the invention exhibit good long-term stability, a characteristic that is particularly useful in formic acid fuel cell applications.

An aspect of the invention is an electrocatalyst, comprising a platinum (Pt)-containing substrate, a submonolayer of Pb adsorbed onto the Pt-containing substrate, and an aqueous solution comprising $Pb^{2+}$; wherein the concentration of $Pb^{2+}$ in the aqueous solution is 10 to 500 micromolar (μM); and the Pt-containing substrate is in contact with the aqueous solution.

An aspect of the invention is a fuel cell, comprising an anode, a cathode, an aqueous fuel solution in contact with the anode, and an oxidant in contact with the cathode; wherein:

the anode comprises a platinum (Pt)-containing substrate; and the aqueous fuel solution comprises formic acid in a concentration up to about 1.5 molar (M); and $Pb^{2+}$ in a concentration of 10 to 500 micromolar (μM).

An aspect of the invention is a method of generating an electric current, comprising completing a circuit between the anode and the cathode of a fuel cell of the invention. In an embodiment, the method further includes the step of adding additional formic acid to the aqueous fuel solution. In an embodiment, the method further includes the step of adding additional oxidant.

An aspect of the invention is a method of making a fuel cell, comprising contacting an anode with an aqueous fuel solution; and
contacting a cathode with an oxidant;
wherein:
the anode comprises a platinum (Pt)-containing substrate; and the aqueous fuel solution comprises formic acid in a concentration up to about 1.5 molar (M); and $Pb^{2+}$ in a concentration of 10 to 500 micromolar (μM).

DETAILED DESCRIPTION OF THE INVENTION

Figure 1A:
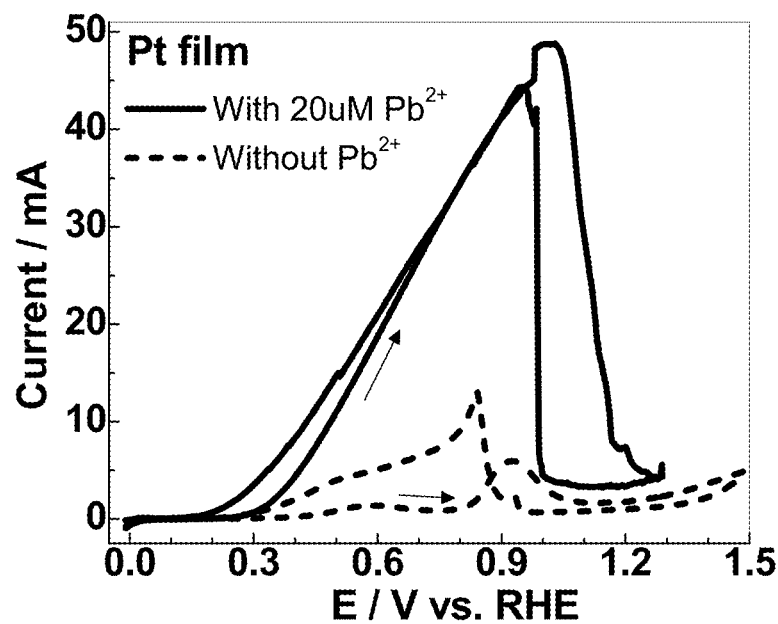
FIG. 1A is a graph depicting cyclic voltammetry for formic acid oxidation reaction (FAOR) on bulk platinum (Pt) with and without 20 micromolar (μM) lead ($Pb^{2+}$). RHE, reference hydrogen electrode.

The invention provides Pt-based PtPb electrocatalysts remarkable for their unusually high activity and stability. These electrocatalysts are particularly useful for formic acid fuel cells.

Fuel cells are electrochemical cells in which a free energy change resulting from a fuel oxidation reaction is converted into electrical energy. Applications for fuel cells include batteries, mini- and microelectronics, car engines, power plants, and others.

For many years, hydrogen fuel cells have served as the gold standard for fuel cell performance. In hydrogen fuel cells, hydrogen gas is oxidized to form water, with a useful electric current produced as a byproduct of the oxidation reaction. Hydrogen fuel cells are impractical for most applications, however, because of difficulties related to storing and handling hydrogen gas.

Organic fuel cells have been developed as alternatives to hydrogen fuel cells. In an organic fuel cell, an organic fuel, such as methanol, is oxidized to carbon dioxide at an anode, while air or oxygen is simultaneously reduced to water at a cathode.

Formic acid is a small organic molecule which can be used as the fuel in a fuel cell. Storage of formic acid is much easier and safer than that of hydrogen because it does not require high pressure or low temperature. In addition, direct formic acid fuel cell technology has shown electrocatalytic oxidation activity far superior to direct methanol fuel cells, and in some cases displayed performances approaching those of $H_2$-polymer electrolyte membrane (PEM) fuel cells.

Formic acid oxidation proceeds rapidly on a clean Pt surface, but poison formation also proceeds rapidly on the Pt surface, thereby limiting the utility of formic acid in fuel cells. For direct formic acid fuel cells, dehydrogenation is the desired reaction pathway, to enhance overall cell efficiency and avoid poisoning of the catalyst.

Bimetallic PtPb prepared by arc-melting has been reported to provide much higher and more stable formic acid oxidation activity than Pt alone. The activity enhancement of Pt—Pb for formic acid oxidation has been attributed to an electronic interaction between Pb and Pt. Xia X et al. (1993) *J Electrochem Soc* 140:2559-2565.

Underpotential deposition (UPD) is a phenomenon of electrodeposition of a species (typically reduction of a metal cation to a solid metal) at a potential less negative than the equilibrium (Nernst) potential for the reduction of this metal. The occurrence of underpotential deposition is often interpreted as a result of a strong interaction between the electrodepositing metal (M) with the substrate (S), of which the electrode is built. The M-S interaction needs to be energetically favored over the M-M interaction in the crystal lattice of the pure metal M. This mechanism is deduced from the observation that UPD typically occurs only up to a monolayer of M.

In accordance with the present invention, an electrocatalyst is provided, wherein the electrocatalyst comprises a platinum (Pt)-containing substrate, a submonolayer of lead (Pb) adsorbed onto the Pt-containing substrate, and an aqueous solution comprising $Pb^{2+}$; wherein the concentration of $Pb^{2+}$ in the aqueous solution is 10 to 500 micromolar (μM); and the Pt-containing substrate is in contact with the aqueous solution.

As used herein, a "submonolayer" refers to a coating, substantially a single atom or single molecule thick (i.e., mono-atomic), that covers less than 100 percent of the surface of the underlying substrate upon which the submonolayer resides. The extent or percentage of surface area covered by lead is referred to as theta ($\theta_{Pb}$). In a preferred embodiment, $\theta_{Pb}$ is greater than zero but less than or equal to 0.5 (i.e., 50 percent). In various embodiments, $\theta_{Pb}$ is greater than zero but less than or equal to 0.45, 0.4, 0.35, 0.3, 0.25, 0.2, 0.15, 0.1, or 0.05.

The submonolayer of Pb typically is formed by underpotential deposition. The UPD process on the Pt surface is provided as:

$$Pb^{2+}+2e^-\rightarrow Pb \tag{10}$$

In the presence of $Pb^{2+}$, the concentration of $Pb^{2+}$ will not change over time because UPD ($Pb^{2+}+2e^-\rightarrow Pb$) and Pb stripping ($Pb\rightarrow Pb^{2+}+2e^-$) together form a cycle to maintain $Pb^{2+}$ concentration in solution. The UPD Pb on Pt acts as a "smart" catalyst for FAOR and is not consumed during FAOR.

Underpotential deposition can only create a mono-atomic layer of Pb on Pt surface, and Pb will not go inside Pt nanoparticles.

In an embodiment, the submonolayer of Pb can be formed at the time the Pt-containing substrate is placed in contact with the aqueous solution comprising $Pb^{2+}$.

In another embodiment, the submonolayer of Pb can be formed separate from and prior to the time the Pt-containing substrate is placed in contact with the aqueous solution comprising $Pb^{2+}$.

In an embodiment, the Pt-containing substrate consists of bulk Pt. For example, the Pt-containing substrate can be pure or substantially pure Pt. In an embodiment, the bulk Pt can take the form of a Pt wire. In an embodiment, the bulk Pt can take the form of a Pt foil. In an embodiment, the bulk Pt can take the form of a Pt film.

In an embodiment, the Pt-containing substrate comprises Pt nanoparticles or Pt black.

In an embodiment, the Pt-containing substrate comprises Pt nanoparticles.

In an embodiment, the Pt-containing substrate comprises Pt black.

In an embodiment, the Pt-containing substrate consists of a coating of Pt nanoparticles on a solid support. The coating of Pt nanoparticles on the solid support can be made using any suitable method.

In an embodiment, the solid support is selected from the group consisting of activated carbon, carbon black, carbon cloth, carbon fiber paper, carbon nanotubes, carbon fibers, graphite, and polymers.

In an embodiment, the solid support is activated carbon.
In an embodiment, the solid support is carbon black.
In an embodiment, the solid support is carbon cloth.
In an embodiment, the solid support is carbon fiber paper.
In an embodiment, the solid support is carbon nanotubes.
In an embodiment, the solid support is carbon fibers.
In an embodiment, the solid support is graphite.
In an embodiment, the solid support is a polymer.

The choice of $Pb^{2+}$ concentration can be based on optimal activity and stability of formic acid electro-oxidation on $PtPb_{UPD}$ with 0.5 coverage ($\theta_{Pb}$=0.5). The mechanism for the optimal concentration of $Pb^{2+}$ is the realization of an optimal coverage of $Pb_{UPD}$ on Pt surface.

In an embodiment in accordance with any of the foregoing, the concentration of $Pb^{2+}$ in the aqueous solution is 50 to 250 μM.

In an embodiment in accordance with any of the foregoing, the concentration of $Pb^{2+}$ in the aqueous solution is 100 to 200 μM.

In an embodiment in accordance with any of the foregoing, the concentration of $Pb^{2+}$ in the aqueous solution is about 150 μM. In an embodiment, the term "about 150 μM", as used herein, refers to 150 μM±10 percent, i.e., 135-165 μM. In an embodiment, the term "about 150 μM" refers to 150 μM±1 percent, i.e., 148-152 μM. In an embodiment, the term "about 150 μM" refers to 150 μM.

An aspect of the invention is a fuel cell, comprising an anode, a cathode, an aqueous fuel solution in contact with the anode, and an oxidant in contact with the cathode; wherein:

the anode comprises a platinum (Pt)-containing substrate; and the aqueous fuel solution comprises formic acid in a concentration up to about 1.5 molar (M); and $Pb^{2+}$ in a concentration of 10 to 500 micromolar (μM).

In an embodiment, the Pt-containing substrate consists of bulk Pt. For example, the Pt-containing substrate can be pure or substantially pure Pt. In an embodiment, the bulk Pt can take the form of a Pt wire. In an embodiment, the bulk Pt can take the form of a Pt foil. In an embodiment, the bulk Pt can take the form of a Pt film.

In an embodiment, the Pt-containing substrate comprises Pt nanoparticles or Pt black.

In an embodiment, the Pt-containing substrate comprises Pt nanoparticles.

In an embodiment, the Pt-containing substrate comprises Pt black.

In an embodiment, the Pt-containing substrate consists of a coating of Pt nanoparticles on a solid support. The coating of Pt nanoparticles on the solid support can be made using any suitable method.

In an embodiment, the solid support is selected from the group consisting of activated carbon, carbon black, carbon cloth, carbon fiber paper, carbon nanotubes, carbon fibers, graphite, and polymers.

In an embodiment, the solid support is activated carbon.
In an embodiment, the solid support is carbon black.
In an embodiment, the solid support is carbon cloth.
In an embodiment, the solid support is carbon fiber paper.
In an embodiment, the solid support is carbon nanotubes.
In an embodiment, the solid support is carbon fibers.
In an embodiment, the solid support is graphite.
In an embodiment, the solid support is a polymer.

In an embodiment in accordance with any of the foregoing, the concentration of $Pb^{2+}$ in the aqueous solution is 50 to 250 μM.

In an embodiment in accordance with any of the foregoing, the concentration of $Pb^{2+}$ in the aqueous solution is 100 to 200 μM.

In an embodiment in accordance with any of the foregoing, the concentration of $Pb^{2+}$ in the aqueous solution is about 150 μM. In an embodiment, the term "about 150 μM", as used herein, refers to 150 μM±10 percent, i.e., 135-165 μM. In an embodiment, the term "about 150 μM", as used herein, refers to 150 μM±1 percent, i.e., 148-152 μM. In an embodiment, the term "about 150 μM" refers to 150 μM.

In an embodiment in accordance with any of the foregoing, the oxidant is air or oxygen.

In an embodiment in accordance with any of the foregoing, the oxidant is air.

In an embodiment in accordance with any of the foregoing, the oxidant is oxygen.

The aqueous fuel solution comprises formic acid in a concentration up to about 1.5 M. In an embodiment, the term "about 1.5 M", as used herein, refers to 1.5 M±10 percent, i.e., 1.3-1.7 M. In an embodiment, the term "about 1.5 M" refers to 1.5 M.

In an embodiment, the aqueous fuel solution comprises formic acid in a concentration of at least 0.1 M.

In an embodiment, the aqueous fuel solution comprises formic acid in a concentration of at least 0.2 M.

In an embodiment, the aqueous fuel solution comprises formic acid in a concentration of at least 0.3 M.

In an embodiment, the aqueous fuel solution comprises formic acid in a concentration of at least 0.4 M.

In an embodiment, the aqueous fuel solution comprises formic acid in a concentration of at least 0.5 M.

In an embodiment, the aqueous fuel solution comprises formic acid in a concentration of at least 0.6 M.

In an embodiment, the aqueous fuel solution comprises formic acid in a concentration of at least 0.7 M.

In an embodiment, the aqueous fuel solution comprises formic acid in a concentration of at least 0.8 M.

In an embodiment, the aqueous fuel solution comprises formic acid in a concentration of at least 0.9 M.

In an embodiment, the aqueous fuel solution comprises formic acid in a concentration of at least 1.0 M.

In an embodiment, the aqueous fuel solution comprises formic acid in a concentration of at least 1.1 M.

In an embodiment, the aqueous fuel solution comprises formic acid in a concentration of at least 1.2 M.

In an embodiment, the aqueous fuel solution comprises formic acid in a concentration of at least 1.3 M.

In an embodiment, the aqueous fuel solution comprises formic acid in a concentration of at least 1.4 M.

An aspect of the invention is a method of generating an electric current, comprising completing a circuit between the anode and the cathode of a fuel cell of the invention.

In an embodiment, the Pt-containing substrate consists of bulk Pt. For example, the Pt-containing substrate can be pure or substantially pure Pt. In an embodiment, the bulk Pt can take the form of a Pt wire. In an embodiment, the bulk Pt can take the form of a Pt foil. In an embodiment, the bulk Pt can take the form of a Pt film.

In an embodiment, the Pt-containing substrate comprises Pt nanoparticles or Pt black.

In an embodiment, the Pt-containing substrate comprises Pt nanoparticles.

In an embodiment, the Pt-containing substrate comprises Pt black.

In an embodiment, the Pt-containing substrate consists of a coating of Pt nanoparticles on a solid support. The coating of Pt nanoparticles on the solid support can be made using any suitable method.

In an embodiment, the solid support is selected from the group consisting of activated carbon, carbon black, carbon cloth, carbon fiber paper, carbon nanotubes, carbon fibers, graphite, and polymers.

In an embodiment, the solid support is activated carbon.

In an embodiment, the solid support is carbon black.

In an embodiment, the solid support is carbon cloth.

In an embodiment, the solid support is carbon fiber paper.

In an embodiment, the solid support is carbon nanotubes.

In an embodiment, the solid support is carbon fibers.

In an embodiment, the solid support is graphite.

In an embodiment, the solid support is a polymer.

In an embodiment in accordance with any of the foregoing, the concentration of $Pb^{2+}$ in the aqueous solution is 50 to 250 μM.

In an embodiment in accordance with any of the foregoing, the concentration of $Pb^{2+}$ in the aqueous solution is 100 to 200 μM.

In an embodiment in accordance with any of the foregoing, the concentration of $Pb^{2+}$ in the aqueous solution is about 150 μM. In an embodiment, the term "about 150 μM", as used herein, refers to 150 μM±10 percent, i.e., 135-165 μM. In an embodiment, the term "about 150 μM", as used herein, refers to 150 μM±1 percent, i.e., 148-152 μM. In an embodiment, the term "about 150 μM" refers to 150 μM.

In an embodiment in accordance with any of the foregoing, the oxidant is air or oxygen.

In an embodiment in accordance with any of the foregoing, the oxidant is air.

In an embodiment in accordance with any of the foregoing, the oxidant is oxygen.

The aqueous fuel solution comprises formic acid in a concentration up to about 1.5 M. In an embodiment, the term "about 1.5 M", as used herein, refers to 1.5 M±10 percent, i.e., 1.3-1.7 M. In an embodiment, the term "about 1.5 M" refers to 1.5 M.

In an embodiment, the aqueous fuel solution comprises formic acid in a concentration of at least 0.1 M.

In an embodiment, the aqueous fuel solution comprises formic acid in a concentration of at least 0.2 M.

In an embodiment, the aqueous fuel solution comprises formic acid in a concentration of at least 0.3 M.

In an embodiment, the aqueous fuel solution comprises formic acid in a concentration of at least 0.4 M.

In an embodiment, the aqueous fuel solution comprises formic acid in a concentration of at least 0.5 M.

In an embodiment, the aqueous fuel solution comprises formic acid in a concentration of at least 0.6 M.

In an embodiment, the aqueous fuel solution comprises formic acid in a concentration of at least 0.7 M.

In an embodiment, the aqueous fuel solution comprises formic acid in a concentration of at least 0.8 M.

In an embodiment, the aqueous fuel solution comprises formic acid in a concentration of at least 0.9 M.

In an embodiment, the aqueous fuel solution comprises formic acid in a concentration of at least 1.0 M.

In an embodiment, the aqueous fuel solution comprises formic acid in a concentration of at least 1.1 M.

In an embodiment, the aqueous fuel solution comprises formic acid in a concentration of at least 1.2 M.

In an embodiment, the aqueous fuel solution comprises formic acid in a concentration of at least 1.3 M.

In an embodiment, the aqueous fuel solution comprises formic acid in a concentration of at least 1.4 M.

In an embodiment in accordance with any of the foregoing, the method further comprises adding to the aqueous fuel solution additional formic acid. Replenishment of formic acid keeps the fuel cell running because formic acid is consumed in the overall reaction (see Equation (5) above).

In an embodiment in accordance with any of the foregoing, the method further comprises further comprising adding additional oxidant. Replenishment of oxidant keeps the fuel cell running because oxidant is also consumed in the overall reaction.

In an embodiment, the additional oxidant is air or oxygen.
In an embodiment, the additional oxidant is air.
In an embodiment, the additional oxidant is oxygen.

An aspect of the invention is a method of making a fuel cell, comprising
contacting an anode with an aqueous fuel solution; and
contacting a cathode with an oxidant;
wherein:
the anode comprises a platinum (Pt)-containing substrate; and
the aqueous fuel solution comprises formic acid in a concentration up to about 1.5 molar (M); and $Pb^{2+}$ in a concentration of 10 to 500 micromolar (μM).

In an embodiment, the Pt-containing substrate consists of bulk Pt. For example, the Pt-containing substrate can be pure or substantially pure Pt. In an embodiment, the bulk Pt can take the form of a Pt wire. In an embodiment, the bulk Pt can take the form of a Pt foil. In an embodiment, the bulk Pt can take the form of a Pt film.

In an embodiment, the Pt-containing substrate comprises Pt nanoparticles or Pt black.

In an embodiment, the Pt-containing substrate comprises Pt nanoparticles.

In an embodiment, the Pt-containing substrate comprises Pt black.

In an embodiment, the Pt-containing substrate consists of a coating of Pt nanoparticles on a solid support. The coating of Pt nanoparticles on the solid support can be made using any suitable method.

In an embodiment, the solid support is selected from the group consisting of activated carbon, carbon black, carbon cloth, carbon fiber paper, carbon nanotubes, carbon fibers, graphite, and polymers.

In an embodiment, the solid support is activated carbon.
In an embodiment, the solid support is carbon black.
In an embodiment, the solid support is carbon cloth.
In an embodiment, the solid support is carbon fiber paper.
In an embodiment, the solid support is carbon nanotubes.
In an embodiment, the solid support is carbon fibers.
In an embodiment, the solid support is graphite.
In an embodiment, the solid support is a polymer.

In an embodiment in accordance with any of the foregoing, the concentration of $Pb^{2+}$ in the aqueous solution is 50 to 250 μM.

In an embodiment in accordance with any of the foregoing, the concentration of $Pb^{2+}$ in the aqueous solution is 100 to 200 μM.

In an embodiment in accordance with any of the foregoing, the concentration of $Pb^{2+}$ in the aqueous solution is about 150 μM. In an embodiment, the term "about 150 μM", as used herein, refers to 150 μM±10 percent, i.e., 135-165 μM. In an embodiment, the term "about 150 μM", as used herein, refers to 150 μM±1 percent, i.e., 148-152 μM. In an embodiment, the term "about 150 μM" refers to 150 μM.

In an embodiment in accordance with any of the foregoing, the oxidant is air or oxygen.

In an embodiment in accordance with any of the foregoing, the oxidant is air.

In an embodiment in accordance with any of the foregoing, the oxidant is oxygen.

The aqueous fuel solution comprises formic acid in a concentration up to about 1.5 M. In an embodiment, the term "about 1.5 M", as used herein, refers to 1.5 M±10 percent, i.e., 1.3-1.7 M. In an embodiment, the term "about 1.5 M" refers to 1.5 M.

In an embodiment, the aqueous fuel solution comprises formic acid in a concentration of at least 0.1 M.

In an embodiment, the aqueous fuel solution comprises formic acid in a concentration of at least 0.2 M.
In an embodiment, the aqueous fuel solution comprises formic acid in a concentration of at least 0.3 M.
In an embodiment, the aqueous fuel solution comprises formic acid in a concentration of at least 0.4 M.
In an embodiment, the aqueous fuel solution comprises formic acid in a concentration of at least 0.5 M.
In an embodiment, the aqueous fuel solution comprises formic acid in a concentration of at least 0.6 M.
In an embodiment, the aqueous fuel solution comprises formic acid in a concentration of at least 0.7 M.
In an embodiment, the aqueous fuel solution comprises formic acid in a concentration of at least 0.8 M.
In an embodiment, the aqueous fuel solution comprises formic acid in a concentration of at least 0.9 M.
In an embodiment, the aqueous fuel solution comprises formic acid in a concentration of at least 1.0 M.
In an embodiment, the aqueous fuel solution comprises formic acid in a concentration of at least 1.1 M.
In an embodiment, the aqueous fuel solution comprises formic acid in a concentration of at least 1.2 M.
In an embodiment, the aqueous fuel solution comprises formic acid in a concentration of at least 1.3 M.
In an embodiment, the aqueous fuel solution comprises formic acid in a concentration of at least 1.4 M.

In an embodiment, the method further comprises the step of connecting the anode to the cathode, e.g., via an external circuit.

The electrocatalysts of the invention are useful in formic acid oxidation reaction (FAOR) and formic acid fuel cells. Comparison of mass and specific activity of electrocatalyst of the invention to related prior art electrocatalysts is shown in Tables 1 and 2 below, where $Pb_{UPD}$—Pt/C refers to certain embodiments of the electrocatalysts of the invention.

TABLE 1

Mass and Specific Activity of FAOR (Cyclic Voltammetry (CV))

| Electrocatalyst | Mass Activity (A/g) | Specific Activity (A/m²) |
|---|---|---|
| $Pb_{UPD}$—Pt/C (CV)[a] | 11700 | 180 |
| Pd black (CV)[a] | 1105 | 55.3 |
| Pd—$Ni_2$P/C-30% (CV)[b] | 1425.2 | 22.4 |
| $Pd_{85}Sn_{15}$ (CV)[c] | 34 | N/A |
| PtBi (CV)[d] | N/A | 64 |

Figure 4:
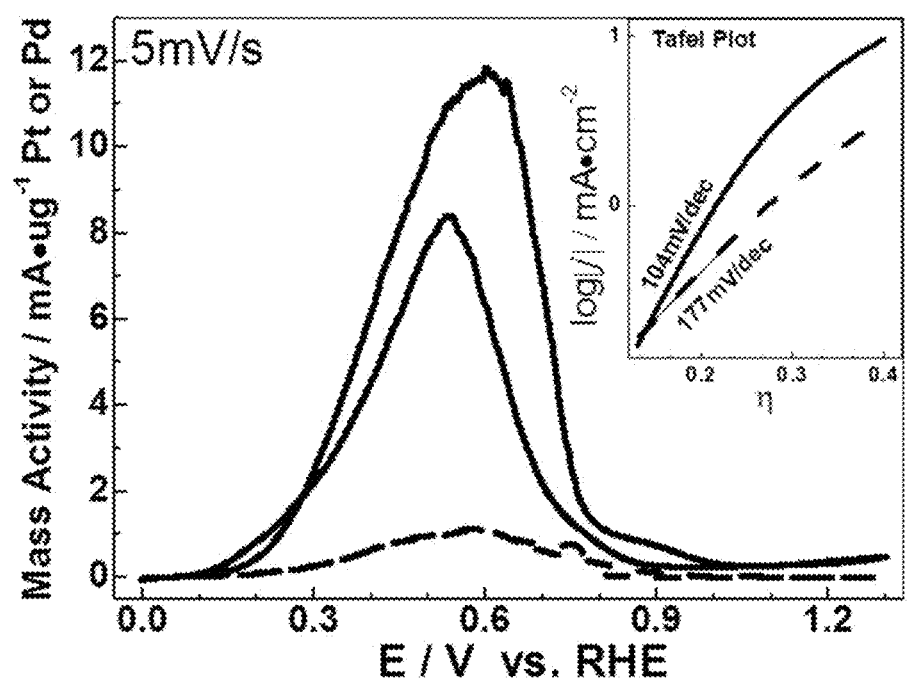
FIG. 4 is a graph depicting cyclic voltammetry of Pt/C (solid line) in 0.1 M $HClO_4$+1.5 M FA+150 μM $Pb(NO_3)_2$, and commercial palladium (Pd) black (dashed line) in 0.1 M $HClO_4$+1.5 M FA, each at 5 mV/s. Inset is a graph depicting a Tafel plot for the two systems.

[a]Peak current densities from CV at 5 mV/s in FIG. 4.
[b]Table S2 in Chang J et al. (2014) Angew Chem Int Ed 53: 122.
[c]FIG. 2 of WO 2008/080227 A1.
[d]FIG. 5 of U.S. Pat. No. 7,455,927.
N/A, data not available.

TABLE 2

Mass and Specific Activity of FAOR (Current Transient (IT))

| Electrocatalyst | Mass Activity (A/g) | Specific Activity (A/m²) |
|---|---|---|
| $Pb_{UPD}$—Pt/C (IT 2 h)[e] | 1917.5 | 29.5 |
| Pd black (IT 2 h)[e] | 42.3 | 2.1 |
| Pd—$Ni_2$P/C-30% (IT 2 h)[f] | 961 | 10.7 |
| Pd on V (IT 2 h)[g] | 1117 | 8.2 |

[e]Current densities at 0.4 V (RHE).
[f]At 0.56 V (RHE) from FIG. S13b in Chang J et al. (2014) Angew Chem Int Ed 53: 122.
[g]FIGS. 2 and 3 of WO 2005/081706 A2.

Having now described the present invention in detail, the same will be more clearly understood by reference to the following examples, which are included herewith for purposes of illustration only and are not intended to be limiting of the invention.

EXAMPLES

Example 1. Effect of Lead ($Pb^{2+}$) on Pt and Pd

A formic acid fuel cell with a bulk platinum anode (~90 nm film) was characterized with and without trace amount (20 μM) of lead ($Pb^{2+}$) in the formic acid fuel solution. Results are shown in FIG. 1A. As can be seen in the figure, the peak current with trace amount of lead present in the formic acid fuel solution was about 50 mA, whereas the peak current without lead in the fuel solution was only about 10 mA. The mass activity would be expected only to be higher with Pt nanoparticles as the anode rather than Pt film.

Figure 1B:
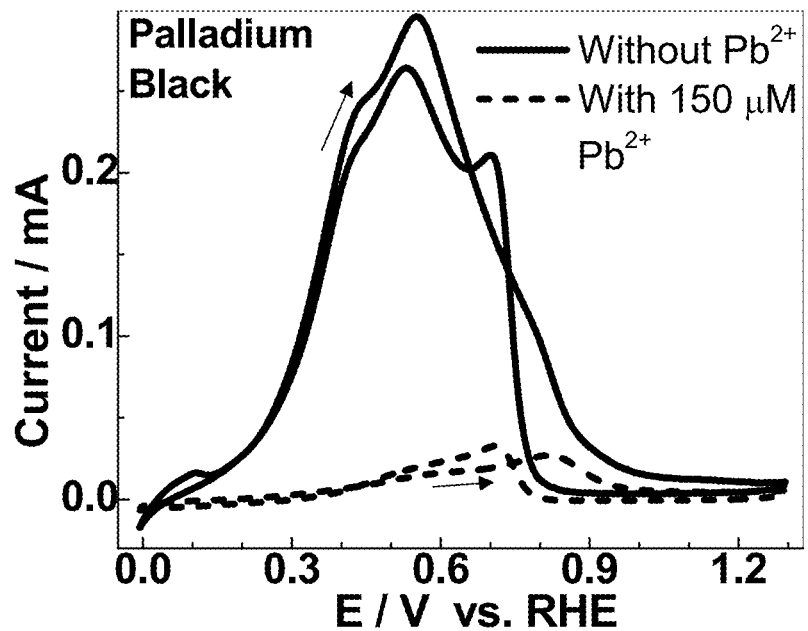
FIG. 1B is a graph depicting cyclic voltammetry for formic acid oxidation reaction (FAOR) on palladium (Pd) black with and without 150 micromolar (μM) lead ($Pb^{2+}$). RHE, reference hydrogen electrode. Note the scale of the y-axis (Current).

Few metals have the activity of formic acid electrooxidation. Palladium (Pd) is another metal which has been intensively studied. In fact, the commercial catalyst for FAOR in formic acid fuel cells is Pd nanoparticles. Therefore, in a related experiment, a comparison was made between Pd nanoparticles (Pd black) with and without 150 μM lead ($Pb^{2+}$) in the formic acid fuel solution. Results are shown in FIG. 1B. As can be seen from the Figure, the peak current without lead in the formic acid fuel solution was about 0.3 mA, whereas the peak current with a trace amount of lead in the fuel solution was only about 0.02 mA.

Figure 2:
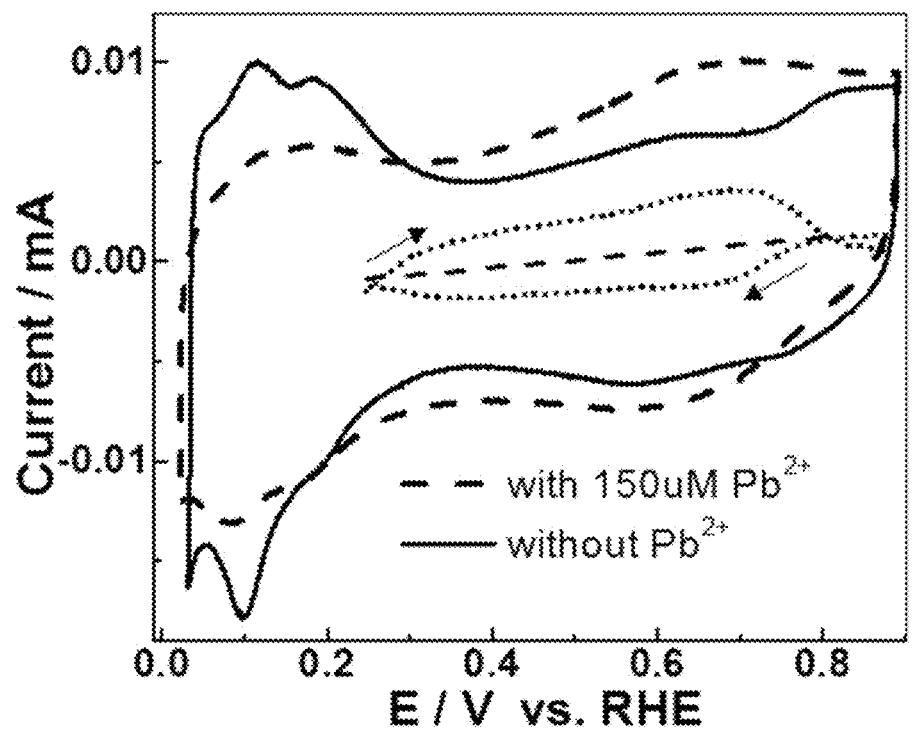
FIG. 2 is a graph depicting cyclic voltammetry of a commercial Pt carbon (Pt/C) electrode in 0.1 M $HClO_4$ (solid line), and in 150 μM $Pb(NO_3)_2$+0.1 M $HClO_4$ (dashed line). Backward scanning (dotted line, $Pb^{2+}+2e^-\rightarrow Pb$) was the subtracted curve of underpotential deposition (UPD) of Pb; forward scanning (dotted line, $Pb\rightarrow Pb^{2+}+2e^-$) was the subtracted curve of Pb stripping. RHE, reference hydrogen electrode.

Example 2. Pt/C in Aqueous $HClO_4$ Solution with and without Trace Amount of $Pb^{2+}$ Cyclic voltammetry was performed on two systems of Pt/C in 0.1 M $HClO_4$ solution, one with and the other without 150 μM $Pb(NO_3)_2$. Results are shown in FIG. 2. As can be seen from the figure, Pt—H adsorption/desorption between 0 and 0.3 V was suppressed with 150 μM $Pb^{2+}$ (dashed line), as compared to that without $Pb^{2+}$ (solid line). The original surface area of the Pt nanoparticles accessible to hydrogen adsorption was 0.15 $cm^2$; but with Pb UPD the hydrogen accessible surface area decreased to 0.09 $cm^2$. Accordingly, the coverage of PbUPD was estimated to be ~0.4 in 150 μM $Pb^{2+}$. The dotted curve indicates the pure Pb UPD and stripping current. The $Pb_{UPD}$ coverage achieved from Pt—H adsorption and desorption in FIG. 2 was 0.4.

Figure 3:
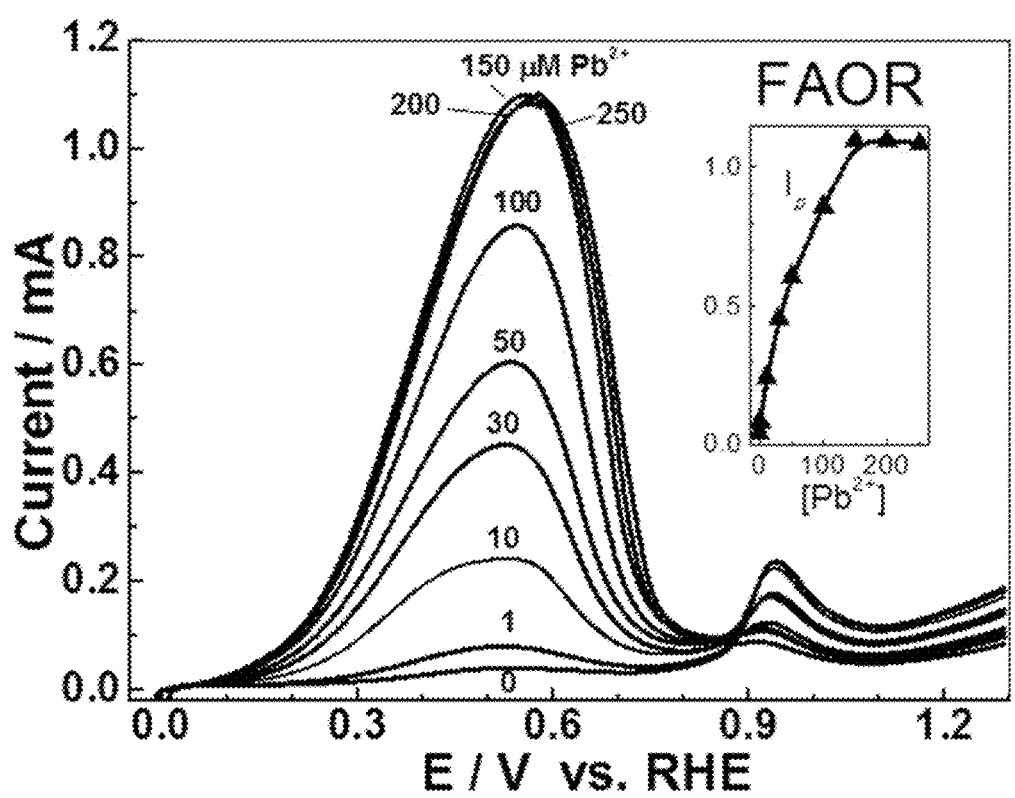
FIG. 3 is a graph depicting cyclic voltammetry of Pt/C in 0.1 M $HClO_4$+1.5 M formic acid (FA) with 0 to 250 μM $Pb(NO_3)_2$. Inset is a graph depicting peak current ($I_p$) versus lead concentration ([$Pb^{2+}$]) (μM). RHE, reference hydrogen electrode; FAOR, formic acid oxidation reaction.

Example 3. Effect of Concentration of $Pb^{2+}$ on Current Generation in Formic Acid Fuel Cell Cyclic voltammetry was performed in systems comprising Pt/C in 0.1 M $HClO_4$+1.5 M formic acid with varying concentrations of $Pb(NO_3)_2$. Results are shown in FIG. 3. As can be seen from the figure, peak current increased sharply with $Pb^{2+}$ concentrations ranging from 1 to about 150 μM, with maximum peak current of about 1.1 mA obtained at a $Pb^{2+}$ concentration of about 150 μM.

Example 4. Pt and Pd Mass Activity

Cyclic voltammetry was performed in systems comprising (i) Pt/C in 0.1 M $HClO_4$+1.5 M formic acid+150 μM $Pb(NO_3)_2$ ($PtPb_{UPD}$ system) and (ii) Pd black in 0.1 M $HClO_4$+1.5 M formic acid (Pd system). Results are shown in FIG. 4. As can be seen from the figure, at 5 mV/s the $PtPb_{UPD}$ system had a peak mass activity of 12 mA/μg Pt, while the Pd system had a peak mass activity of only about 1 mA/μg Pd.

Example 5. Pt and Pd Mass Activity

Figure 5A:
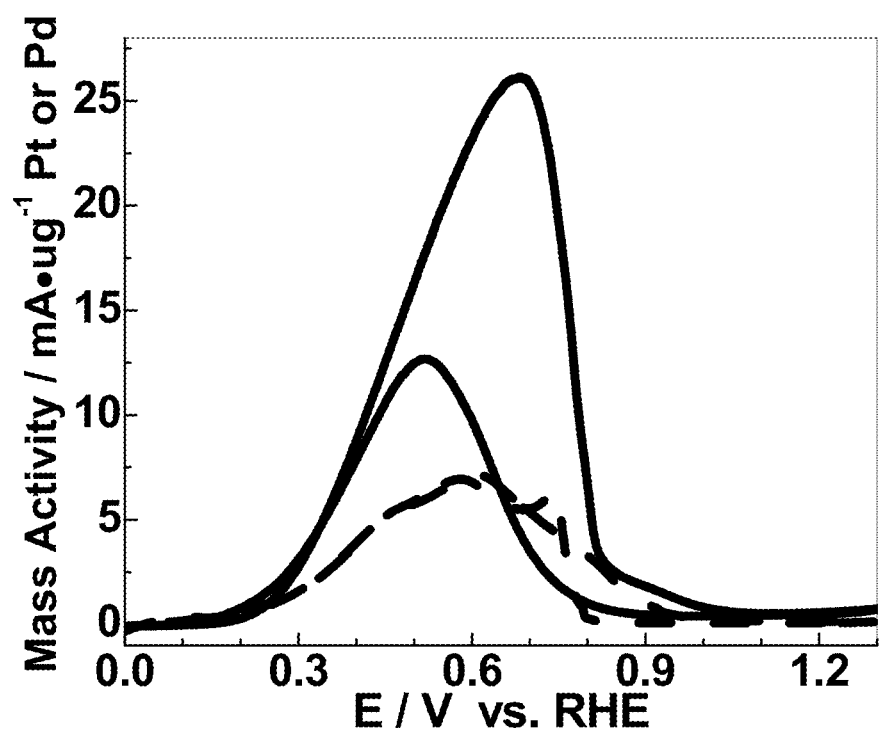
FIG. 5A is a graph depicting cyclic voltammetry of Pt/C (solid line) in 0.1 M $HClO_4$+1.5 M FA+150 μM $Pb(NO_3)_2$, and commercial Pd black (dashed line) in 0.1 M $HClO_4$+1.5 M FA, each at 50 mV/s on rotating disk electrode at 900 RPM. The curve for Pd is magnified 5× actual size.
Figure 5B:
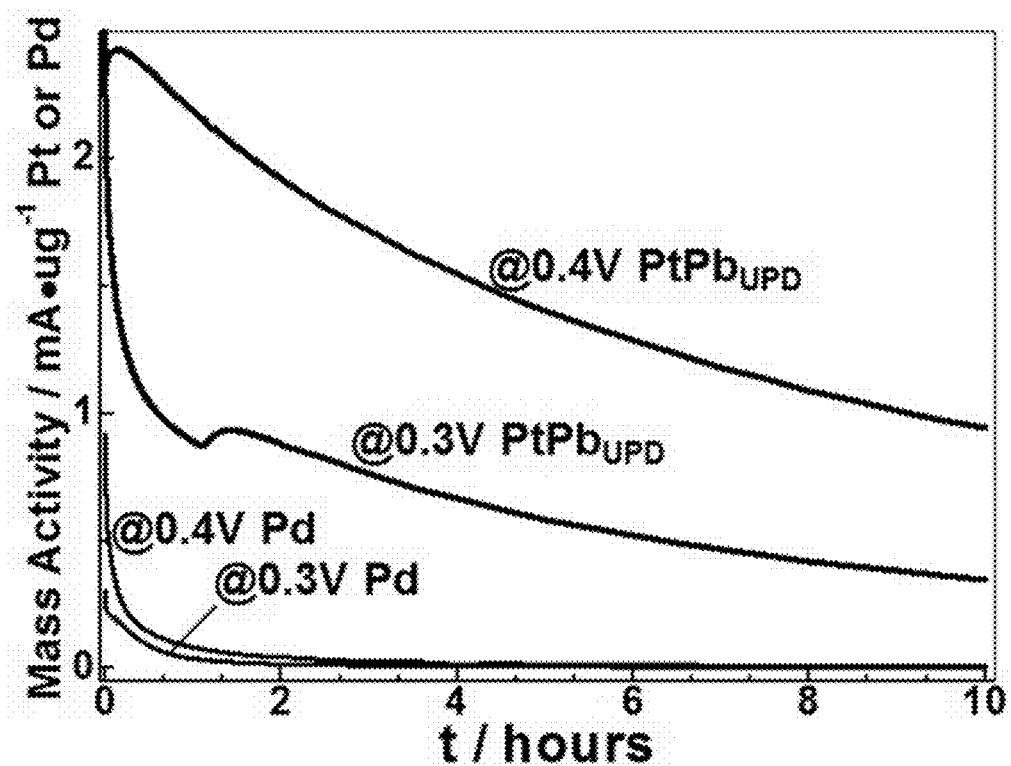
FIG. 5B is a graph depicting mass activity of current transient over 10 h on Pt/C and Pd black at 0.3 V and 0.4 V.

Cyclic voltammetry was performed in systems comprising (i) Pt/C in 0.1 M $HClO_4$+1.5 M formic acid+150 μM $Pb(NO_3)_2$ ($PtPb_{UPD}$ system) and (ii) Pd black in 0.1 M $HClO_4$+1.5 M formic acid (Pd system), each at 50 mV/s. Results are shown in FIG. 5. As can be seen from FIG. 5A, the $PtPb_{UPD}$ system had a peak mass activity of 25 mA/μg Pt, while the Pd system had a peak mass activity of only about 1 mA/μg Pd. As can be seen from FIG. 5B, mass activity of current transient at 10 h for the $PtPb_{UPD}$ system was about 1 mA/μg Pt at 0.4 V, while the corresponding value for the Pd system was zero (0) mA/μg Pd.

Example 6. Optimization of $Pb^{2+}$ Concentration

Figure 6A:
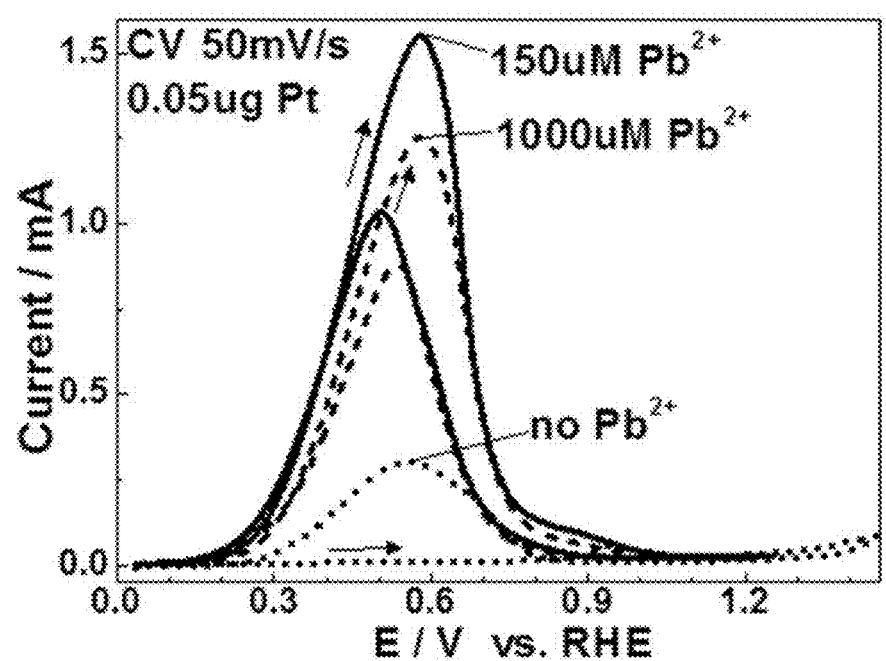
FIG. 6A is graph depicting cyclic voltammetry of Pt/C at 50 mV/s in 0.1 M $HClO_4$+1.5 M FA with $Pb(NO_3)_2$ at 0 μM (dotted line), 150 μM (solid line), or 1000 μM (dashed line).

Cyclic voltammetry was performed in systems comprising Pt/C in 0.1 M $HClO_4$+1.5 M formic acid+$Pb(NO_3)_2$ (0, 150 μM, or 1000 μM (i.e., 1 mM)), at 50 mV/s. Results are shown in FIG. 6A. As can be seen from the figure, peak current with 1000 μM (i.e., 1 mM) $Pb^{2+}$ was substantially decreased compared to peak current with 150 μM $Pb^{2+}$.

Figure 6B:
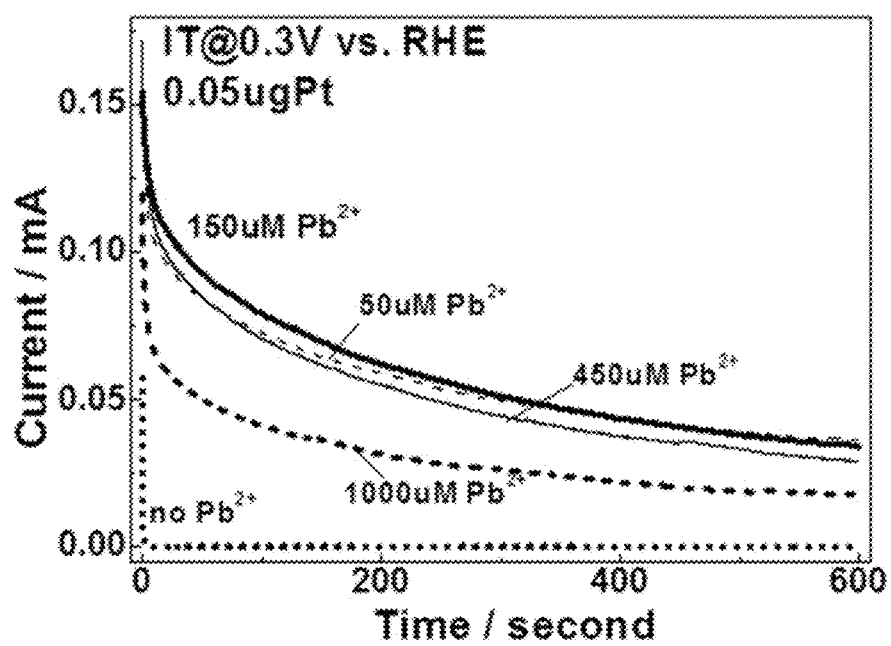
FIG. 6B is a graph depicting current transient (IT) on Pt/C at 0.3 V with indicated concentrations (i.e., 0, 50, 150, 450, 1000 μM) of $Pb(NO_3)_2$.

In a related experiment, current transient was measured in systems comprising Pt/C in 0.1 M $HClO_4$+1.5 M formic acid+$Pb(NO_3)_2$ (0, 50 μM, 150 μM, 450 μM, or 1000 μM (i.e., 1 mM)), at 0.3 V vs. RHE. Results are shown in FIG. 6B. As can be seen from the figure, current transient for the system with 150 μM $Pb^{2+}$ appeared to be optimal and was approximately twice that for the system with 1000 μM $Pb^{2+}$.

Figure 6C:
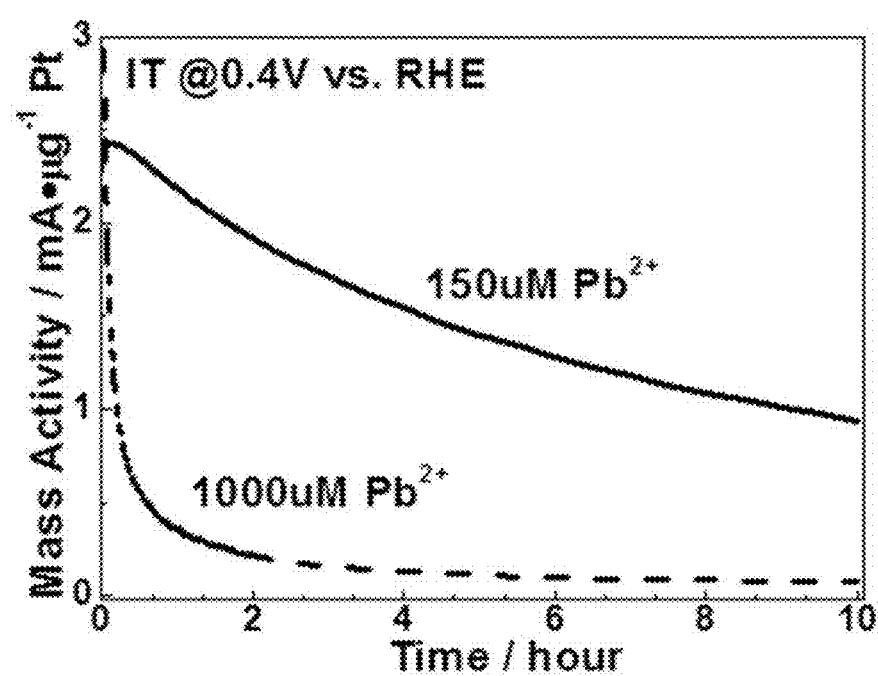
FIG. 6C is a graph depicting a comparison of mass activity and stability at 0.4 V over 10 hours with $Pb(NO_3)_2$ at 150 μM (solid line) and 1000 μM (dashed line).
Figure 6D:
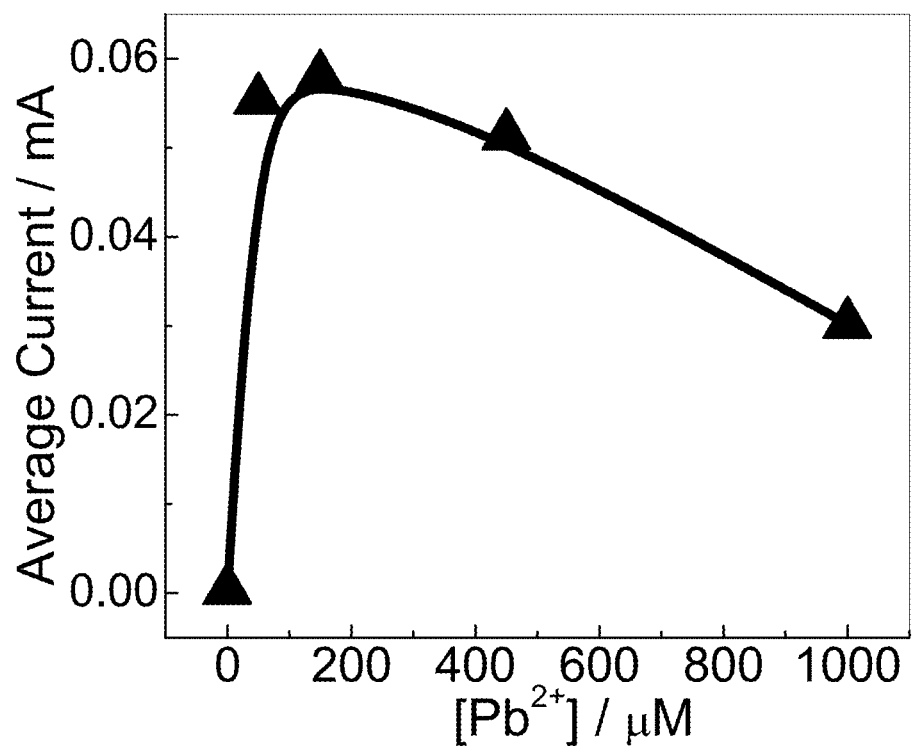
FIG. 6D is a graph of average current as a function of $Pb^{2+}$ concentration (at 0, 50, 150, 450, 1000 μM) for Pt/C at 0.3 V. Related to FIG. 6B.

In a related experiment, current transient was measured in systems comprising Pt/C in 0.1 M $HClO_4$+1.5 M formic acid+$Pb(NO_3)_2$ (150 μM or 1000 μM (i.e., 1 mM)), at 0.4 V vs. RHE. Results are shown in FIG. 6C. As can be seen from the figure, mass activity for the system with 150 μM $Pb^{2+}$ was substantially greater than for the system with 1000 μM $Pb^{2+}$ at essentially all time points measured out to 10 h. Mass activity values at 10 h for the 150 μM $Pb^{2+}$ system and the 1000 μM $Pb^{2+}$ system were 1 mA/μg and essentially zero (0) mA/μg, respectively.

INCORPORATION BY REFERENCE

All patents and published patent applications mentioned in the description above are incorporated by reference herein in their entirety.

EQUIVALENTS

Having now fully described the present invention in some detail by way of illustration and example for purposes of clarity of understanding, it will be obvious to one of ordinary skill in the art that the same can be performed by modifying or changing the invention within a wide and equivalent range of conditions, formulations and other parameters without affecting the scope of the invention or any specific embodiment thereof, and that such modifications or changes are intended to be encompassed within the scope of the appended claims.

The invention claimed is:

1. An electrocatalyst, comprising a platinum (Pt)-containing substrate having a surface, a submonolayer of lead (Pb) adsorbed onto the Pt-containing substrate, and an aqueous solution comprising $Pb^{2+}$; wherein the submonolayer of lead is a coating, substantially a single atom or single molecule thick, that covers less than 100 percent of the surface of the Pt-containing substrate; the concentration of $Pb^{2+}$ in the aqueous solution is 10 to 500 micromolar (μM); and the Pt-containing substrate is in contact with the aqueous solution.

2. The electrocatalyst of claim 1, wherein the Pt-containing substrate consists of bulk Pt.

3. The electrocatalyst of claim 1, wherein the Pt-containing substrate comprises Pt nanoparticles or Pt black.

4. The electrocatalyst of claim 1, wherein the Pt-containing substrate consists of a coating of Pt nanoparticles on a solid support.

5. The electrocatalyst of claim 4, wherein the solid support is selected from the group consisting of activated carbon, carbon black, carbon cloth, carbon fiber paper, carbon nanotubes, carbon fibers, graphite, and polymers.

6. The electrocatalyst of claim 1, wherein the concentration of $Pb^{2+}$ in the aqueous solution is 50 to 250 μM.

7. A method of making a fuel cell, comprising
contacting an anode with an aqueous fuel solution; and
contacting a cathode with an oxidant;
wherein:
the anode comprises the electrocatalyst of claim 1; and
the aqueous fuel solution comprises formic acid in a concentration up to about 1.5 molar (M) and $Pb^{2+}$ in a concentration of 10 to 500 micromolar (μM).

8. A fuel cell, comprising an anode, a cathode, an aqueous fuel solution in contact with the anode, and an oxidant in contact with the cathode; wherein:
the anode comprises the electrocatalyst of claim 1; and
the aqueous fuel solution comprises formic acid in a concentration up to about 1.5 molar (M) and $Pb^{2+}$ in a concentration of 10 to 500 micromolar (μM).

9. The fuel cell of claim 8, wherein the Pt-containing substrate consists of bulk Pt.

10. The fuel cell of claim 8, wherein the Pt-containing substrate comprises Pt nanoparticles or Pt black.

11. The fuel cell of claim 8, wherein the Pt-containing substrate consists of a coating of Pt nanoparticles on a solid support.

12. The fuel cell of claim 11, wherein the solid support is selected from the group consisting of activated carbon, carbon black, carbon cloth, carbon fiber paper, carbon nanotubes, carbon fibers, graphite, and polymers.

13. The fuel cell of claim 8, wherein the concentration of $Pb^{2+}$ in the aqueous fuel solution is 50 to 250 μM.

14. A method of generating an electric current, comprising completing a circuit between the anode and the cathode of the fuel cell of claim 8.

15. The method of claim 14, wherein the Pt-containing substrate consists of bulk Pt.

16. The method of claim 14, wherein the Pt-containing substrate comprises Pt nanoparticles or Pt black.

17. The method of claim 14, wherein the Pt-containing substrate consists of a coating of Pt nanoparticles on a solid support.

18. The method of claim 17, wherein the solid support is a selected from the group consisting of activated carbon, carbon black, carbon cloth, carbon fiber paper, carbon nanotubes, carbon fibers, graphite, and polymers.

19. The method of claim 14, wherein the concentration of $Pb^{2+}$ in the aqueous fuel solution is 50 to 250 μM.

* * * * *